United States Patent
Miyazawa

(10) Patent No.: US 7,046,148 B2
(45) Date of Patent: May 16, 2006

(54) DISTRIBUTION MANAGEMENT SYSTEM

(75) Inventor: Tetsuya Miyazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 10/870,370

(22) Filed: Jun. 17, 2004

(65) Prior Publication Data

US 2005/0140509 A1    Jun. 30, 2005

(30) Foreign Application Priority Data

Dec. 24, 2003    (JP) .............................. 2003-428271

(51) Int. Cl.
*G08B 13/14*    (2006.01)
(52) U.S. Cl. ..................... 340/572.1; 340/571; 235/384
(58) Field of Classification Search ............. 340/572.1, 340/572.4, 571; 235/384, 385
See application file for complete search history.

(56) References Cited

U.S. PATENT DOCUMENTS 5,686,888 A * 11/1997 Welles et al. .......... 340/539.13
5,745,036 A * 4/1998 Clare ....................... 340/572.1
5,936,523 A * 8/1999 West ....................... 340/545.6
6,542,114 B1 * 4/2003 Eagleson et al. ...... 342/357.07
6,972,682 B1 * 12/2005 Lareau et al. ............ 340/568.1
6,982,640 B1 * 1/2006 Lindsay et al. ............. 340/540

FOREIGN PATENT DOCUMENTS

| JP | 2002036659 | 2/2002 |
| JP | 2002046815 | 2/2002 |
| JP | 2002096913 | 4/2002 |

* cited by examiner

*Primary Examiner*—Toan N. Pham
(74) *Attorney, Agent, or Firm*—Greer, Burns & Crain, Ltd

(57) ABSTRACT

Electronic tags are directly attached to commodities to be transported one by one. Gate terminals are installed on buildings or sites of traders long a distribution channel of the commodities. The electronic tag detects the commodity temperature and records it at intervals. When the commodity passes near the gate terminal, the information of the commodity temperature is transmitted to the gate terminal through the wireless communication. If the received information shows failure of the temperature control, the gate terminal output a warning.

5 Claims, 12 Drawing Sheets

| Commodity ID | Quality certificating temperature | Condition 1 | Condition 2 |
|---|---|---|---|
| tuna01 | 0° C~5° C | More than 10 minutes under 0° C | More than 5 minutes beyond 5° C |

Condition table 11

| Time | Commodity temperature | Deterioration flag |
|---|---|---|
| 10:00 | 3C° | 0 |
| 10:01 | 4C° | 0 |
| 10:02 | 4C° | 0 |
| 10:03 | 4C° | 0 |
| 10:04 | 7C° | 0 |
| 10:05 | 8C° | 0 |
| 10:06 | 8C° | 0 |
| 10:07 | 8C° | 0 |
| 10:08 | 8C° | 1 |
| ⋮ | ⋮ | ⋮ |

Worktable 13

DISTRIBUTION MANAGEMENT SYSTEM

BACKGROUND OF THE INVENTION

The present invention relates to a distribution management system for managing temperature of a commodity that should be transported and stored under controlled temperature until it is delivered to a consumer.

In distribution, it is important to keep a value of a commodity under transport until it is delivered to a final consumer. However, when temperature of commodities such as frozen/refrigerated foods or perishable foods that should be treated under controlled temperature increases to improper temperature during transport or storage, the freshness of the commodities will be lost, which decreases the commodity value. Therefore, various distribution management systems for managing temperature of a commodity during transport and storage have been developed.

Publications of unexamined Japanese patent applications P2002-036656A, P2002-046815A and P2002-096913A disclose conventional distribution management systems.

The distribution management systems disclosed in the publications measure room temperature inside a transportation container that can be carried by means of transport every moment, and accumulate the temperature data obtained by the measurement in a server computer or the like. And then, when a retail seller receives a complaint from a consumer about a sold commodity, for example, the retail seller obtains the temperature data from the server computer to do a follow-up survey for checking which step lowered the commodity value in the distribution channel However, since the conventional distribution management system measures room temperature inside the transportation container only as shown in the publications, it was impossible to check conditions of commodities one by one. Temperatures at different positions may be different to each other even in the same transportation container. Therefore, the conditions of the commodities maybe different depending on their positions. For example, the increase of the room temperature inside the transportation container from the opening and closing of the door thereof may deteriorate the condition of one commodity even if the condition of another commodity is normal. Further, many of frozen foods or the like are difficult to check their contents by appearance because of packaging, in general. Therefore, a commodity whose value is lowered due to the increase of the room temperature may be delivered to a consumer.

Furthermore, in the conventional distribution management system described above, a follow-up survey after the distribution of the commodity can specify the point of time when the commodity value was lowered during distribution. However, the conventional system could not make a quick response such as a supplement of a commodity, an apology to a retail seller and indemnity to a retail seller at the instant following the lowering of the commodity value.

SUMMARY OF THE INVENTION

It is therefore an object of the present invention to provide an improved distribution management system, which is capable of managing conditions of respective commodities and of enabling a quick response when a value of any one commodity will be lowered.

For the above object, according to the present invention, there is provided a distribution management system, which includes a great number of electronic tags that are directly attached to commodities to be transported, one by one, and a great number of gate terminals located on distribution channels of the commodities. Each of the electronic tags includes a recording portion that stores information, a transmitting portion that transmits information to the gate terminals, a commodity temperature detecting portion that detects temperature of the commodity to which the electronic tag is attached, a record controlling portion that records information created based on the commodity temperature detected by the commodity temperature detecting portion into the recording portion at the predetermined time intervals, and a transmission controlling portion that makes the transmitting portion transmit the information stored in the recording portion to the gate terminals. Each of the gate terminals includes a receiving portion that receives the information from the electronic tags, a determining portion that determines whether a warning should be output or not based on the received information from the electronic tags, and a warning portion that outputs the warning when the determining portion determines that the warning should be output.

With this construction, the electronic tag is directly attached to the respective commodities and records the information created based on the commodity temperature detected by the commodity temperature detecting portion into the recording portion. The transmitting potion of the electronic tag transmits the information to the gate terminal. On the other hand, each gate terminal installed in each point along the distribution channel receives the information from the electronic tag by the receiving portion. The determining portion of the gate terminal determines whether the warning should be output or not based on the received information. If the determining portion determines that the warning should be output, the warning portion output the warning.

Therefore, according to the present invention, the condition of the commodities are checked each time when the gate terminal receives the information from the electronic tags. If the condition of any commodities are deteriorated due to failure of the temperature control, the gate terminal outputs the warning.

As a result, the condition of the commodities can be immediately checked when the electronic tags pass through the gate terminal. Further, a trader can remove the deteriorated commodity, which enables a quick response such as a supplement of a commodity, an apology and indemnity before the commodity reaches lowermost part in the distribution channel.

That is, the present invention enables to manage the conditions of the respective commodities one by one and to respond quickly when the values of any commodities are lowered.

DESCRIPTION OF THE ACCOMPANYING DRAWINGS

DESCRIPTION OF THE PREFERRED EMBODIMENTS

Hereinafter, three embodiments of the present invention will be described with reference to the accompanied drawings.

First Embodiment

Figure 1:
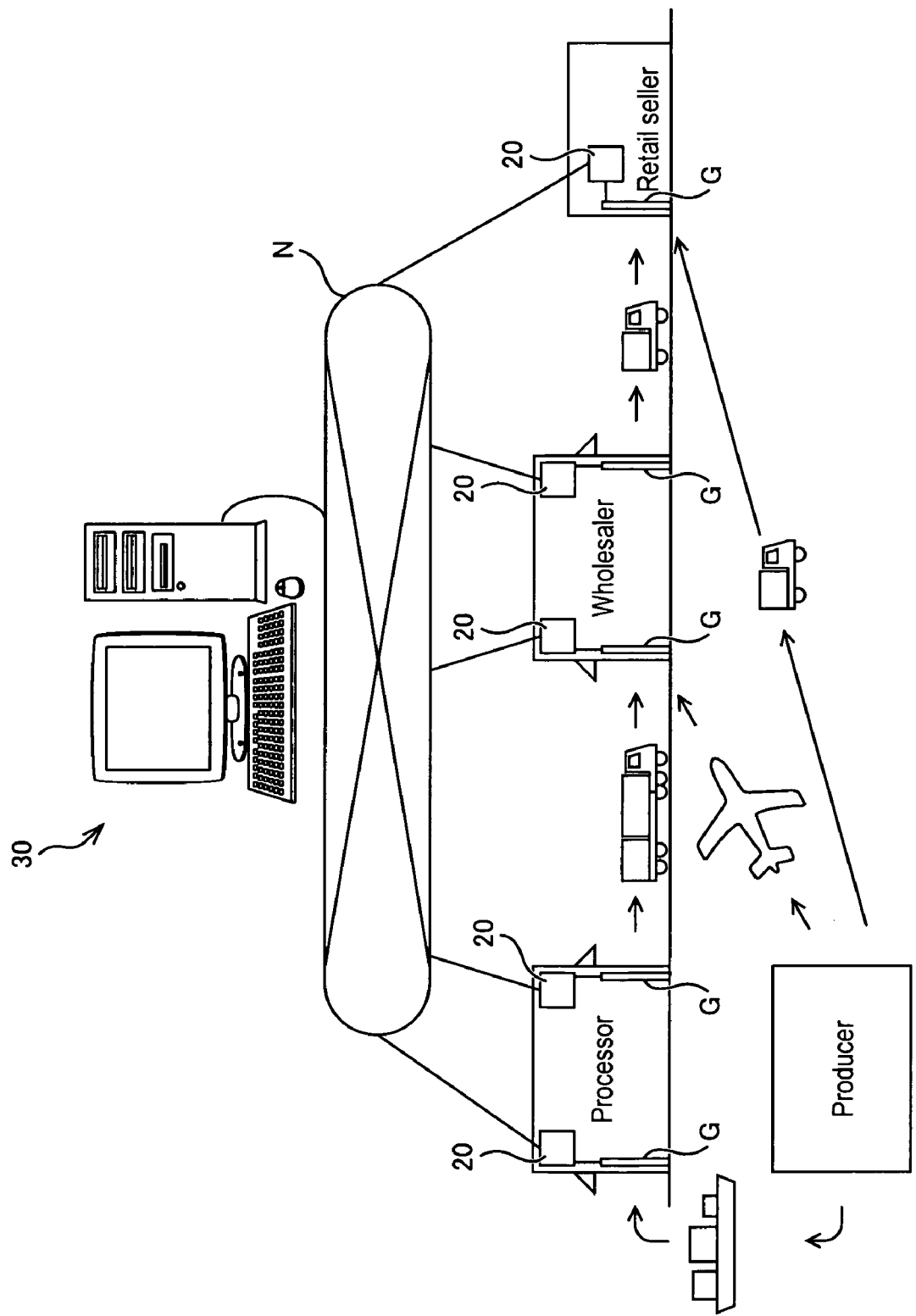
FIG. 1 is a block diagram showing a general construction of a distribution management system according to a first embodiment.

FIG. 1 is a block diagram showing a general construction of the first embodiment. The distribution management system of the present invention is applied to a distribution network that is operated by producers, processors, warehousemen, wholesalers, retail sellers and carriers that transport commodities among these contractors by means of transport.

In the distribution network, producers mean daily farmers who produce milk, a cheese, etc., fishery households who land fishery products, farmers who cultivate and harvests vegetables, fruits, etc., or other traders. Further, processors mean traders who cut or peel livestock, fishery products or vegetables for commercial purpose, makers who manufacture frozen food for microwave cooking or ice cream, etc., or other traders. Means of transport include trucks, cargo ships, transport planes and freight trains, etc.

The producers, processors and wholesalers may be domestic traders or may be foreign traders. If the producers, processors and wholesalers are foreign traders, commodities may be temporally stocked by the warehousemen before loading into cargo ships or transport planes and/or after unloading from them. Further, commodities produced by the producers may be directly transported to the retail sellers or may be transported to the retail sellers through the wholesalers. Still further, commodities manufactured by the processors may be directly transported to the retail sellers or may be transported to the retail sellers through the wholesalers.

Figure 2:
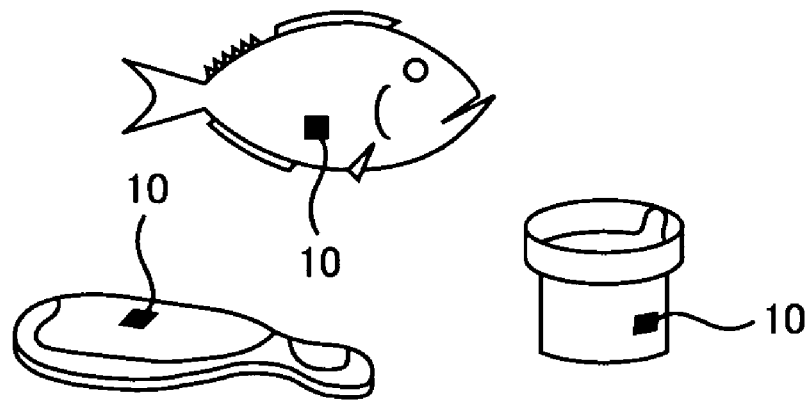
FIG. 2 shows commodities to which electronic tags are attached.

In the distribution network to which the present invention is applied, an electronic tag 10 is attached to each and every commodity that is shipped from producers or processors as shown in FIG. 2, which is a perspective view. Further, as shown in FIG. 1, gate antennas G are installed at the carrying-in gate and taking-out gate of buildings or sites of the processor, wholesaler and retail seller for carrying out wireless communication with the electronic tags 10. Still further, gate terminals 20 connected to the respective gate antennas G are installed inside the buildings of the respective traders. If the commodities carry in and take out through the same gate, the trader may have one set of the gate antenna G and the gate terminal 20. The gate terminals 20 of the respective traders are connected to a server 30 through a network N.

Figure 3:
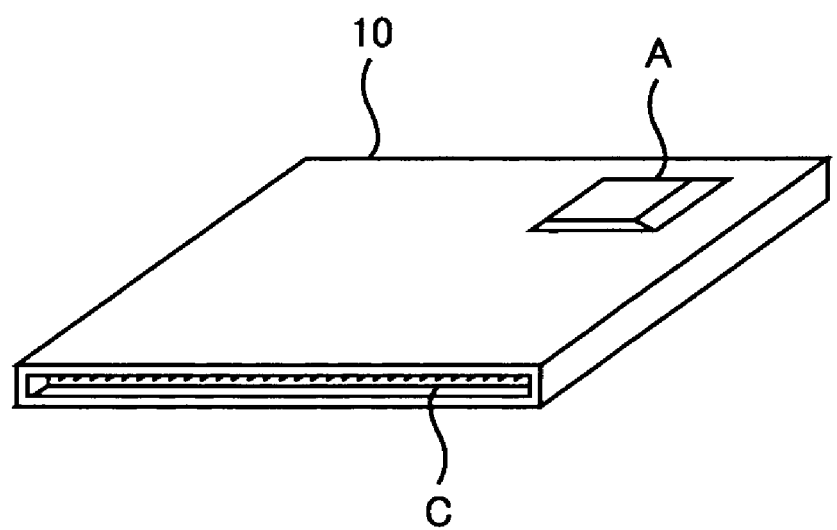
FIG. 3 is a perspective view of one example of the electronic tag.

FIG. 3 is a perspective view of one example of the electronic tag 10. The shape of the electronic tag 10 may be freely designed. In this embodiment, the electronic tag 10 is formed as a thin rectangular plate. At the one side edge of the electronic tag 10, a waterproof connector c is installed to enable detachable connection with a data rewriting device (not shown) that rewrites the data recorded in the electronic tag 10. Further, on the one flat surface (upper surface in FIG. 3), an antenna A is attached to carry out wireless communication with the gate antenna G. The other flat surface is used as a fitting surface that is directly attached to a commodity. The outer shell of the fitting surface is preferably formed from metal of high thermal conductivity such as aluminum, copper and silver. In this embodiment, the electronic tag 10 is fitted to a commodity by clear thin film covering the tag together with the commodity or by a ring-shaped rubber band tightening the tag to the commodity.

Figures 4, 5:
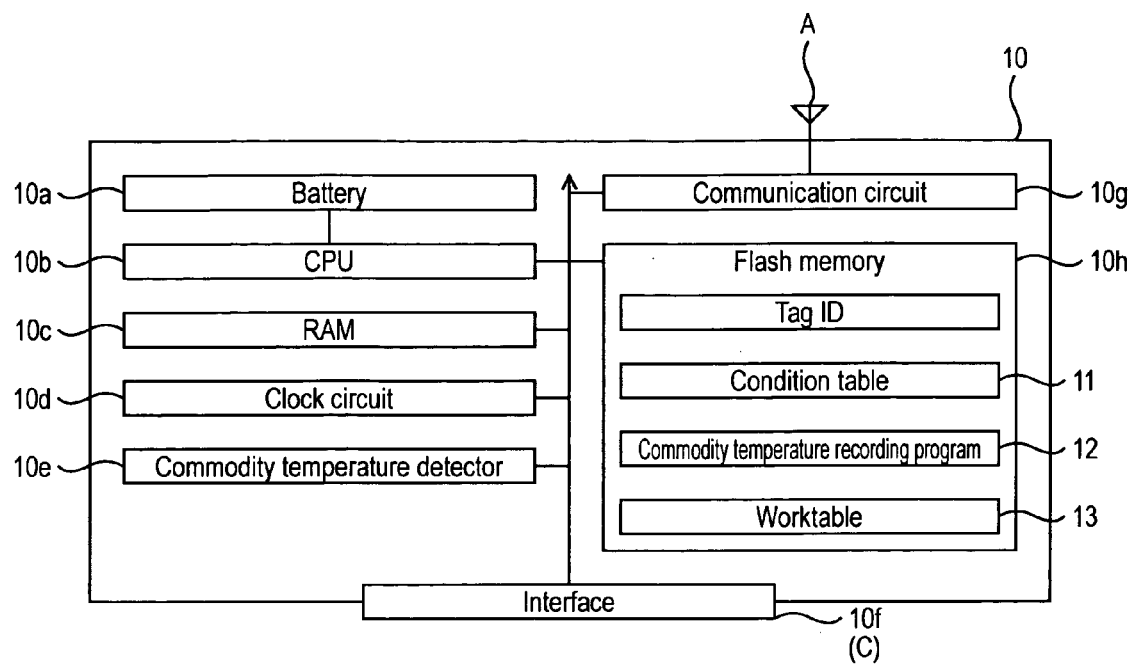
FIG. 4 is a block diagram showing a general inside construction of the electronic tag.
FIG. 5 shows one example of a condition table.

FIG. 4 is a block diagram showing a general construction inside the electronic tag 10. The electronic tag 10 is provided with a battery 10a, a central processing unit (CPU) 10b, a random access memory (RAM) 10c, a clock circuit 10d, a commodity temperature detector 10e, an interface 10f, a communication circuit 10g and a flash memory 10h.

The battery 10a supplies electric power to the respective circuits 10b through 10h. The battery 10a may be a rechargeable type or an exchangeable type. The CPU 10b totally controls the circuits 10c through 10h. The RAM 10C is a memory on which a part of the program executed by the CPU 10b and frequently accessed data are temporally memorized.

The clock circuit 10d generates clock signals at a predetermined time intervals. The time indicated by the time information recorded in the predetermined area in the RAM 10c advances at each clock signal. The commodity temperature detector 10e is a digital temperature sensor that detects thermo current or resistance varying according to temperature. Receiving an instruction from the CPU 10b, the commodity temperature detector 10e detects the commodity temperature that is the temperature of the commodity to which the electronic tag 10 is attached. Then, the commodity temperature detector 10e converts the detected temperature into the temperature value and output the converted temperature value to the CPU 10b as the commodity temperature information. In addition, a detection point of the commodity temperature detector 10e contacts the inside of the fitting surface of the outer shell of the electronic tag 10.

The interface 10f includes the waterproof connector c described above. The interface 10f controls data communication between the electronic tag 10 and the data rewriting device (not shown) when the waterproof connector C is connected to a connector joint of the data rewriting device. The communication circuit 10g is connected to the antenna A and carries out wireless communication with the gate antenna G through the use of the antenna A. The antenna A and the interface 10g correspond to the transmitting portion and the receiving portion of the electronic tag, respectively.

The flash memory 10h stores data and programs. A tag ID (identification), a condition table 11, a commodity temperature recording program 12 and a worktable 13 are stored in the flash memory 10h. The tag ID uniquely identifies one electronic tag 10 among a great number of electronic tags 10.

The condition table 11 is downloaded from the data rewriting device (not shown) into the flash memory 10h through the interface 10f. FIG. 5 shows one example of the condition table 11. As shown in FIG. 5, the condition table 11 contains a record (the temperature condition information) that has fields of "Commodity ID", "Quality certificating temperature", "Condition 1" and "Condition 2". Commodity ID that uniquely identifies a kind of a commodity is recorded in the "Commodity ID" field. A range of quality certification temperature that is required to keep the value of the commodity to which the electronic tag 10 is attached is recorded in the "Quality certificating temperature" field. First and second deterioration conditions are recorded in the "Condition 1" field and the "Condition 2" field, respectively. The first and second deterioration conditions are used to determine whether the value of the commodity to which the electronic tag 10 is attached is lowered or not.

The specific value of the temperature condition information recorded in the condition table 11 can be selected from various values in accordance with the kind of commodities in the distribution management system. For example, the tuna includes various kinds such as a blue fin tuna, a big-eyed tuna, a yellow fin tuna, a southern blue fin tuna, an albacore tuna, and the ranges of the quality certificating temperature and the deterioration conditions are different depending on the kinds. Therefore, a record that consists of the range of the quality certificating temperature, the deterioration condition and the commodity ID is defined for each and every kind of the commodity. For example, when the electronic tag 10 is attached to a blue fin tuna, the condition table 11 that includes temperature condition information corresponding to a blue fin tuna is downloaded into the electronic tag. 10 before use. If the electronic tag 10 that have been attached to the certain commodity will be reused to the different kind of commodity, the old condition table 11 in the electronic tag 10 is overwritten with a newly downloaded condition table 11.

The commodity temperature recording program 12 makes the CPU 10b detect the temperature of the commodity on which the electronic tag 10 is attached every moment, record the commodity temperature information obtained by the detection in order, and determine whether the commodity matches the deterioration condition or not with reference to the condition table 11. The commodity temperature recording program 12 of the first embodiment corresponds to the record controlling portion and the transmission controlling portion of the electronic tag.

Figures 6, 7:
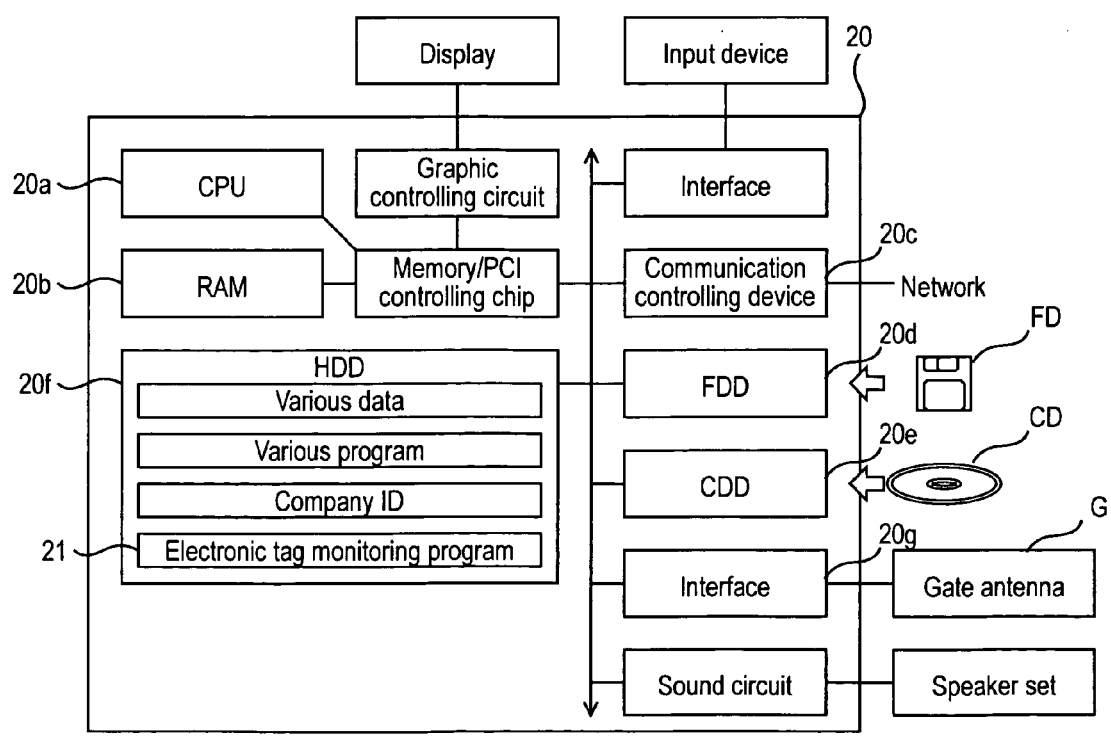
FIG. 6 shows one example of a worktable.
FIG. 7 is a block diagram showing a general inside construction of a gate terminal.

The commodity temperature information is recorded into the work table 13 during the execution of the commodity temperature recording program 12. FIG. 6 shows one example of the worktable 13. AS shown in FIG. 6, many records each of which includes fields of "Time", "commodity temperature" and "Deterioration flag" are stored in the worktable 13.

The time information is stored in the "Time" field. The commodity temperature information is stored in the "commodity temperature" field. In the "Deterioration flag" field, "1" or "0" is set in response to the matching of the combination of the time information and the commodity temperature information with the first and second deterioration conditions. In the initial state immediately after the power turns ON or the reset button (not shown) is pushed, no information is stored in the worktable 13.

FIG. 7 is a block diagram showing the inside construction of the gate terminal 20 installed in the buildings of the processor, warehouseman, wholesaler and retail seller. The gate terminal 20 is a computer that is on the market and it connects to a display for indicating various-screens, a speaker set for outputting sound and an input device including a keyboard and a mouse. The display and the speaker set correspond to the warning portion. Further, the gate terminal 20 is provided with a CPU 20a, a RAM 20b, a communication controlling device 20c, a flexible disk drive (FDD) 20d, a compact disk drive (CDD) 20e, a hard disk drive (HDD) 20f and an interface 20g.

The CPU 20a totally controls the devices 20b through 20g. The RAM 20b is a memory on which a part of the program executed by the CPU 20a. and frequently accessed data are temporally memorized. The communication controlling device 20c is a network adapter, a modem, a DSU or a NIC that connects to the network N through a communication line such as a telephone line or LAN. The communication controlling device 20c controls data communication with computers connected to the network N. The communication controlling device 20c of the first embodiment corresponds to the transmitting portion of the gate terminal.

The FDD 20d and the CDD 20e read data and programs stored in a computer-readable media such as a flexible disk FD and a compact disk CD, and write data and programs into the disks FD and CD. Data and programs read by the drives 20d and 20e from the disks FD and CD are installed into the HDD 20f.

The HDD 20f is a storage to which various data and programs are read and written. A company ID that uniquely identifies trader who has the gate terminal 20 in its building is recorded in the HDD 20f. Further, the HDD 20f stores the operating system program (not shown) that totally manages hardware and software, and an electronic tag monitoring program 21.

The electronic tag monitoring program 21 makes the CPU 20a receive the data (a set of records having the time information, the commodity temperature information and the deterioration flag) output from the electronic tag 10, transmit the received data to the server 30 and output the warning when the received data requires the warning. The electronic tag monitoring program 21 corresponds to the determining portion, the warning portion and the transmission controlling portion of the gate terminal.

The interface 20g controls the gate antenna G to carry out wireless data communication. The interface 20g controls the gate antenna G so that the gate antenna G always output a transmission instruction signal. Receiving the transmission instruction signal, the electronic tag 10 transmits the data in the worktable 13. Further, when the data is transmitted from the electronic tag 10 in response to the transmission instruction signal, the interface 20g receives the data and transfers the data to the CPU 20a. The interface 20g corresponds to the receiving portion of the gate terminal.

Figure 8:
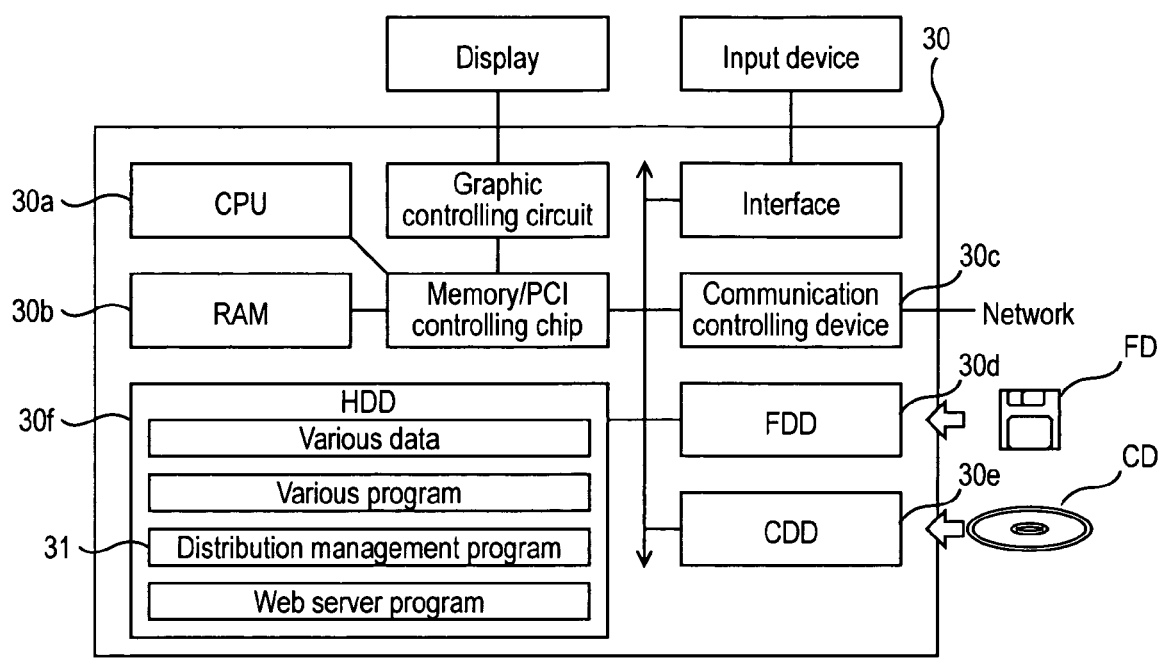
FIG. 8 is a block diagram showing a general inside construction of a server.

FIG. 8 is a block diagram showing an inside construction of the server 30. The server 30 is also a computer that is on the market. The server 30 is provided with a CPU 30a, a RAM 30b, a communication controlling device 30c, an FDD 30d, a CDD 30e and an HDD 30f. The server 30 corresponds to the storage device. Further, the communication controlling device 30c of the first embodiment corresponds to the receiving portion of the storage device.

Since the devices 30a through 30f in the server 30 are identical to the devices 20a through 20f of the gate terminal 20, descriptions for these devices are omitted.

However, the HDD 30*f* stores a distribution management program 31 instead of the electronic tag monitoring program 21. Further, a web server program is stored in the HDD 30*f* to give a function as a web server to the server 30.

The distribution management program 31 makes the CPU 30*a* store the data received from the gate terminal 20 into the HDD 30*f*. The web server program makes the CPU 30*a* transmit the web page data in response to the request from a computer on the network N. The web server program is used to disclose the data in the HDD 30*f* stored by the distribution management program 31 and the related information to consumers. That is, the web server program provides a consumer with the web page including the data, the graphs and tables using the data through the web browser on other computers connected with the network N.

Processes executed in the above-described distribution management system will be described.

When a perishable food like fish or vegetable is distributed from a producer to a retail seller through a processor and/or a wholesaler as a commodity, for example, the producer downloads the condition table 11 for the commodity into the electronic tag 10 through the use of the above-described data rewriting device (not shown). Then the producer attaches the electronic tags 10 to the commodities one by one and pushes the reset buttons of the respective electronic tags 10.

On the other hand, when a commodity such as a frozen food and a refrigeration food is distributed from a processor to a retail seller directly or through a wholesaler, for example, the processor downloads the condition table 11 for the commodity into the electronic tag 10 through the use of the above-described data rewriting device (not shown). Then the processor attaches the electronic tags 10 to the commodities one by one and pushes the reset buttons of the respective electronic tags 10.

In either case, when a commodity is packed in a package by the uppermost trader on the distribution channel, the trader downloads the condition table 11 for the commodity into the electronic tag 10, attaches the electronic tag 10 to the commodity and pushes the reset button of the electronic tag 10.

Figure 9:
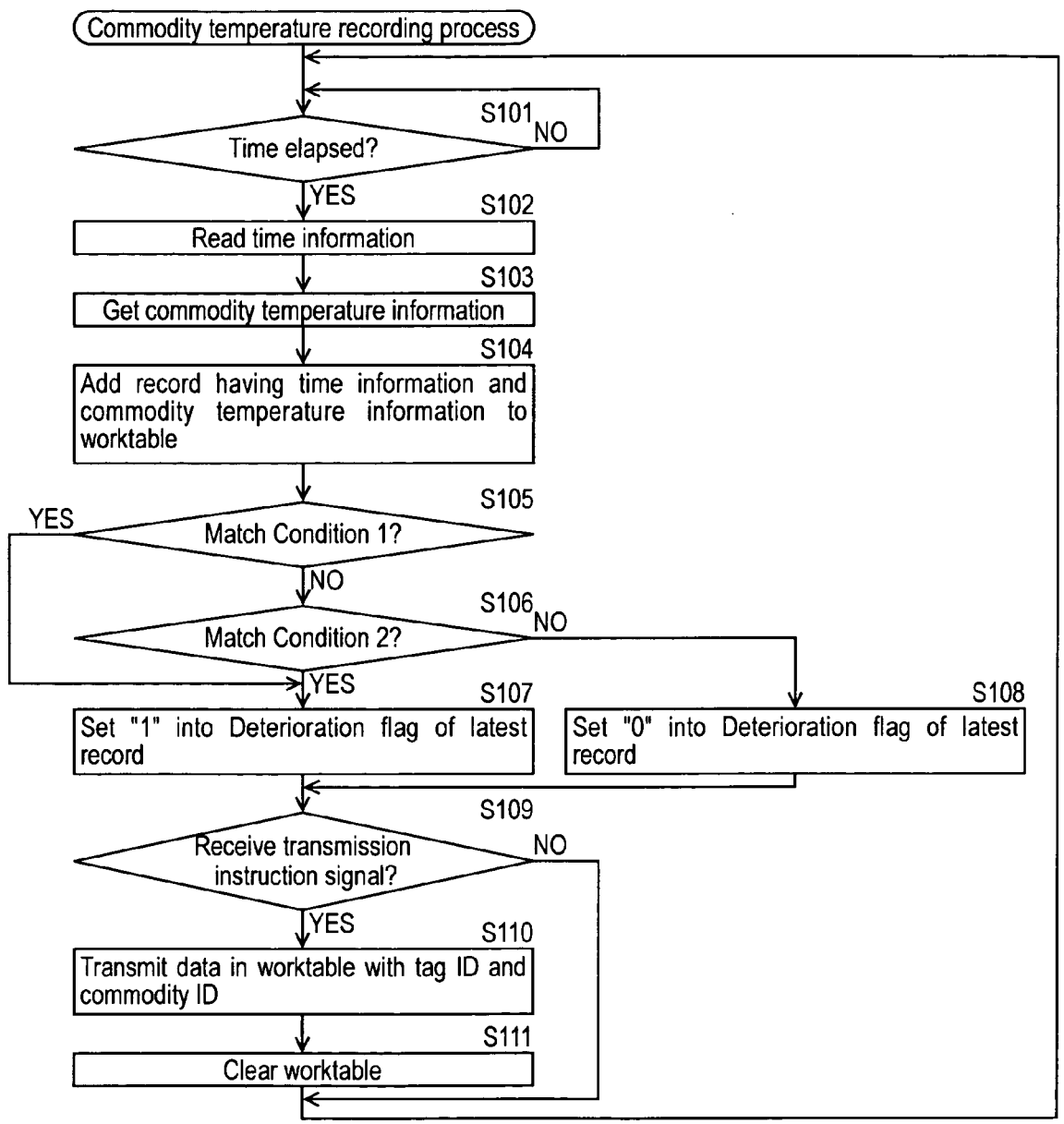
FIG. 9 is a flowchart showing a commodity temperature recording process according to the first embodiment.

Then, the CPU lob loads the commodity temperature recording program 12 from the flash memory 10*h* in each of the electronic tag 10, and starts the commodity temperature recording process. FIG. 9 is a flowchart showing the commodity temperature recording process.

At the first step S101 in the commodity temperature recording process, the CPU 10*b* waits until a predetermined time interval (a minute, for example) elapses from the point in time when the process started or from the point in time when the latest S101 was finished. After the expiration of, the predetermined time interval, the CPU 10*b* advances the process to S102.

At S102, the CPU lob reads the time information recorded in the predetermined area in the RAM 10*c* and advances the process to S103.

At S103, the CPU10*b* gets the temperature value (the commodity temperature information) from the commodity temperature detector 10*e* and advances the process to S104.

At S104, the CPU 10*b* adds a new record, which consists of the time information read at S102 and the commodity temperature information gotten at S103, into the worktable 13 and advances the process to S105.

At S105, the CPU 10*b* determines whether the data in the worktable 13 matches with the first deterioration condition or not. For instance, when the contents of the condition table 11 are coincident with FIG. 5, the CPU 10*b* reads the first deterioration condition from the field of "Condition 1", and determines whether ten latest records including the record stored at S104 in the worktable 13 match the first deterioration condition or not when the data in the worktable 13 matches the first deterioration condition, the CPU 10*b* advances the process to S107. If the data does not match the condition, the CPU 10*b* advances the process to S106.

At S106, the CPU 10*b* determines whether the data in the worktable 13 match the second deterioration condition or not. For instance, when the contents of the condition table 11 are coincident with FIG. 5, the CPU 10*b* reads the second deterioration condition from the field of "Condition 2", and determines whether five latest records including the record stored at S104 in the worktable 13 match the second deterioration condition or not. When the data in the worktable 13 matches the second deterioration condition, the CPU 10*b* advances the process to S107.

At S107, the CPU 10*b* sets "1" into the "Deterioration flag" field of the latest record in the worktable 13. The value "1" set in the "Deterioration flag" corresponds to the deterioration information. After setting the deterioration flag, the CPU 10*b* advances the process to S109.

On the other hand, when the CPU 10*b* determines that the data in the worktable 13 does not match the second deterioration condition at S106, the CPU 10*b* advances the process to S108. That is, the CPU 10*b* advances the process to S108 when the data in the worktable 13 neither matches the first nor second deterioration conditions.

At S108, the CPU 10*b* set the value "0" into the "Deterioration flag" field of the latest record in the worktable 13 and advances the process to S109.

At S109, the CPU 10*b* determines whether the transmission instruction signal, which is always output from the gate antenna G, has been received or not after the point in time when the commodity temperature recording process started or the point in time when the latest S109 was finished. When the transmission instruction signal has not been received, the CPU 10*b* returns the process to S101.

If the transmission instruction signal is received during the process loop S101 through S109, the CPU 10*b* causes the process to branch from S109 to S100.

At S110, the CPU 10*b* transmits the data (all the records) in the worktable 13 with the tag ID in the flash memory 10*h* and the commodity ID in the condition table 11 to the gate terminal 20. Then, the CPU 10*b* advances the process to S111.

At S111, the CPU 10*b* clears the worktable 13 by deleting the data (all the records) in the worktable 13. Then, the CPU 10*b* returns the process to S101 and waits until the predetermined time interval elapses.

Since the above-described commodity temperature recording process is executed, the electronic tag 10 that is attached to the commodity by a producer or a processor records the temperature of the commodity at the predetermined time intervals. Further, the electronic tag 10 determines whether the commodity temperature matches the deterioration condition or not at each time when the commodity temperature information is recorded. If the commodity temperature matches the deterioration condition, the CPU 10*b* sets the deterioration flag. Still further, the electronic tag 10 transmits the data in the worktable 13 to the gate terminal 20 in response to the transmission instruction signal output from the gate antenna G when the commodity passes through the carrying-in gate or the taking-out gate of each trader at which the gate antenna G is installed. Then the CPU 10*b* clear the worktable 13. Therefore, the data of the commodity (a set of records having the time information, the commodity temperature information and the deterioration flag) accumulated in the electronic tag 10 within a period of time for moving the commodity from one gate terminal 20 to the next gate terminal 20 (i.e., a period of time for transport by a carrier or a period of time for retention by a warehouse man or a wholesaler) are delivered to the gate terminal 20.

Figure 10:
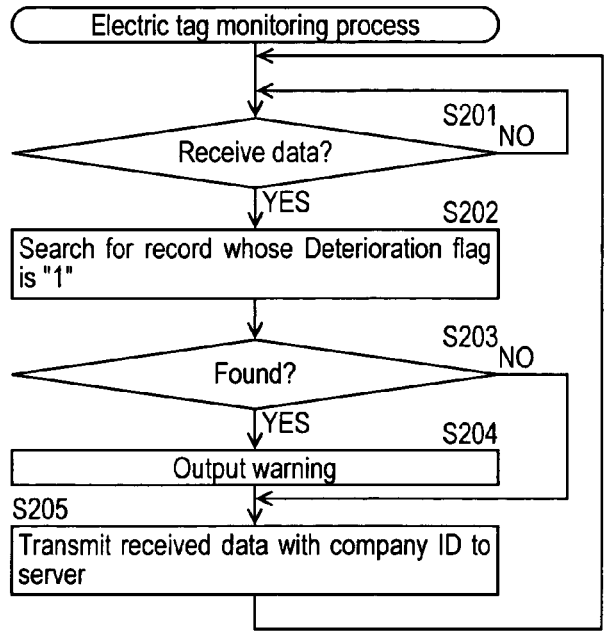
FIG. 10 is a flowchart showing an electronic tag monitoring process according to the first embodiment.

On the other hand, when the main power of the gate terminal 20 turns ON, the CPU 20a reads the electronic tag monitoring program 21 and the electronic tag monitoring process is executed. In addition, the gate terminal 20 can execute many electronic tag monitoring processes as parallel processing. Therefore, when a great number of electronic tags 10 pass through the carrying-in gate or the taking-out gate at a time, the gate terminal 20 can monitor all the electronic tags 10. FIG. 10 is a flowchart showing the electronic tag monitoring process.

At the first step S201 in the electronic tag monitoring process, the CPU 20a waits until it receives the data in the worktable 13 and the commodity ID from any electronic tags 10. Receiving the data, the tag ID and the commodity ID from any electronic tags 10, the CPU 20a advances the process to S202.

At S202, the CPU 20a searches the data received from the electronic tag 10 for the record whose deterioration flag is "1" and advances the process to S203.

At S203, the CPU 20a judges whether the record whose deterioration flag is "1" was found or not. If the record was not found, the CPU 20a advances the process to S205. On the other hand, if the record was found, the CPU 20a advances the process to S204.

At S204, the CPU 20a outputs the warning indicating that the electronic tag 10 matching the deterioration condition passes through the communicatable zone of the gate antenna G. The warning may be indicated as characters or graphics displayed or blinked on the display of the gate terminal 20. Further, the warning may be expressed as sound or buzzer output from the speaker set, or may be indicated by turning a revolving light ON. The CPU 20a advances the process to S205 after outputting the warning.

At S205, the CPU 20a transmits the data, the tag ID and the commodity ID received at S201 together with the company ID read from the HDD 20f to the server 30. After that, the CPU 20a returns the process to S201 and waits until a record is received from any electronic tags 10.

Since the above-described electronic tag monitoring process is executed, the gate terminal 20, which always outputs the transmission instruction signal, is able to collect the data accumulated in the electronic tag 10 when the electronic tag 10 passes through the communicatable zone of the gate antenna G. Further, the gate terminal 20 adds the company ID to the collected data and transmits the data with the company ID to the server 30. Still further, when the record whose deterioration flag is "1" is found in the data collected from the electronic tag 10, the gate terminal 20 outputs the warning to give a notice to the chairman who is responsible for the commodity to which the electronic tag 10 is attached about the deterioration of the commodity. The chairman who receives the notice can know that some commodities were deteriorated within his/her responsible term. More specifically, the responsible term for a warehouseman or a wholesaler is a term of storage from time when the laid-in commodity passes through the carrying-in gate to time when the commodity passes through the taking-out gate. Further, the responsible term for a carrier is a term of transport from time when the commodity passes through the taking-out gate of a sender to time when the commodity passes through the carrying-in gate of a receiver. A chairman who is aware that some commodities were deteriorated can confirm the deteriorated commodities and remove them.

Figure 11:
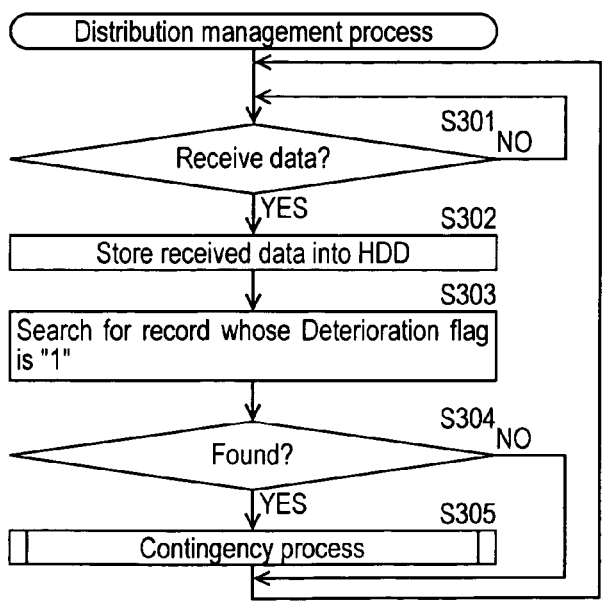
FIG. 11 is a flowchart showing a distribution management process according to the first embodiment.

When the main power of the server 30 turns ON, the CPU 30a loads the distribution management program 31 and the distribution management process is executed. FIG. 11 is a flowchart showing the distribution management process.

At the first step S301 of the distribution management process, the CPU 30a waits until it receives the data, the tag ID, the commodity ID and the company ID accumulated in the electronic tag 10 from any one of the gate terminals 20. Receiving the data, the tag ID, the commodity ID and the company ID from any one of the gate terminals 20, the CPU 30a advances the process to S302.

At S302, the CPU 30a stores the data, the tag ID, the commodity ID and the company ID received from the gate terminal 20 into the HDD 30f. Actually, the CPU 30a stores many records into a predetermined table in the HDD 30f at a time. Each record includes fields of "Time information", "Commodity temperature information", "Commodity ID", "Tag ID", and "Company ID". Then, the CPU 30a advances the process to S303.

At S303, the CPU 30a searches the data received from the gate terminal 20 for the record whose deterioration flag is "1" and advances the process to S304.

At S304, the CPU 30a judges whether the record whose deterioration flag is "1" was found or not. If the record was not found, the CPU 30a returns the process to S301. on the other hand, if the record was found, the CPU 30a advances the process to S305.

At S305, the CPU 30a executes a contingency process. The contents of the contingency process vary from company to company. The contents of the contingency process are preset in response to the company ID's stored in the HDD 30f at S302. Specifically, at S305, the CPU 30a informs the retail seller about apology and indemnity, and/or the CPU 30a informs the producer or the processor about a request to supplement the commodities. These information may be informed as an electronic mail that is automatically sent by the server 30. The CPU 30a returns the process to S301 after the execution of the contingency process and waits until the data is received from anyone of the gate terminals 20.

According to the above-described distribution management process, the server 30 stores the data that are accumulated in the electronic tags 10 and collected by the gate terminals 20 in a lump. That is, the server 30 stores the data that indicate the conditions of the respective commodities during distribution. Then, the data stored in the server 30 can be used as a database for a follow-up survey of the conditions of the commodities during distribution. Further, the average commodity temperature of each section along the distribution channel may be calculated for each of the gate terminals. In such a case, if the average commodity temperature of each section is disclosed on a web page on the network N, the condition of the commodity during distribution will be disclosed to consumers.

As described above, the distribution management system of the first embodiment checks deterioration of the respective commodities at each time when the commodities pass through the communicatable zone of the gate antenna G. Since the gate terminals are installed at the carrying-in gate or the taking-out gate of traders, the quality of commodities are checked when a chairman of the commodities is replaced. Therefore, a trader can check whether the any commodities are deteriorated or not immediately after the replacement of the chairman.

Further, according to the first embodiment, the quality of commodity is checked at each time it passes through the communicatable zone of the gate antenna G. This clarifies who is responsible with respect to the issue of deterioration.

Still further, according to the first embodiment, when deterioration of a commodity is found, a trader can remove the deteriorated commodity, which enables a quick response such as a supplement of a commodity, an apology and indemnity before the commodity reaches lowermost part in the distribution channel.

Yet further, the first embodiment enables to disclose the information about the commodity during distribution to consumers through the use of the data accumulated in the server 30. Therefore, consumers can confirm safety of foods to eat.

Second Embodiment

Although the electronic tag 10 determines whether the commodity is deteriorated or not in the first embodiment, the server 30 determines that in the second embodiment. The generic construction of the second embodiment is identical to the first embodiment. However, the processes for the second embodiment are slightly different from the processes shown in FIG. 9 through FIG. 11, and the condition table 11 is stored in the server 30 not in the electronic tag 10. Hereinafter, the processes that are different from the first embodiment will be described.

Figure 12:
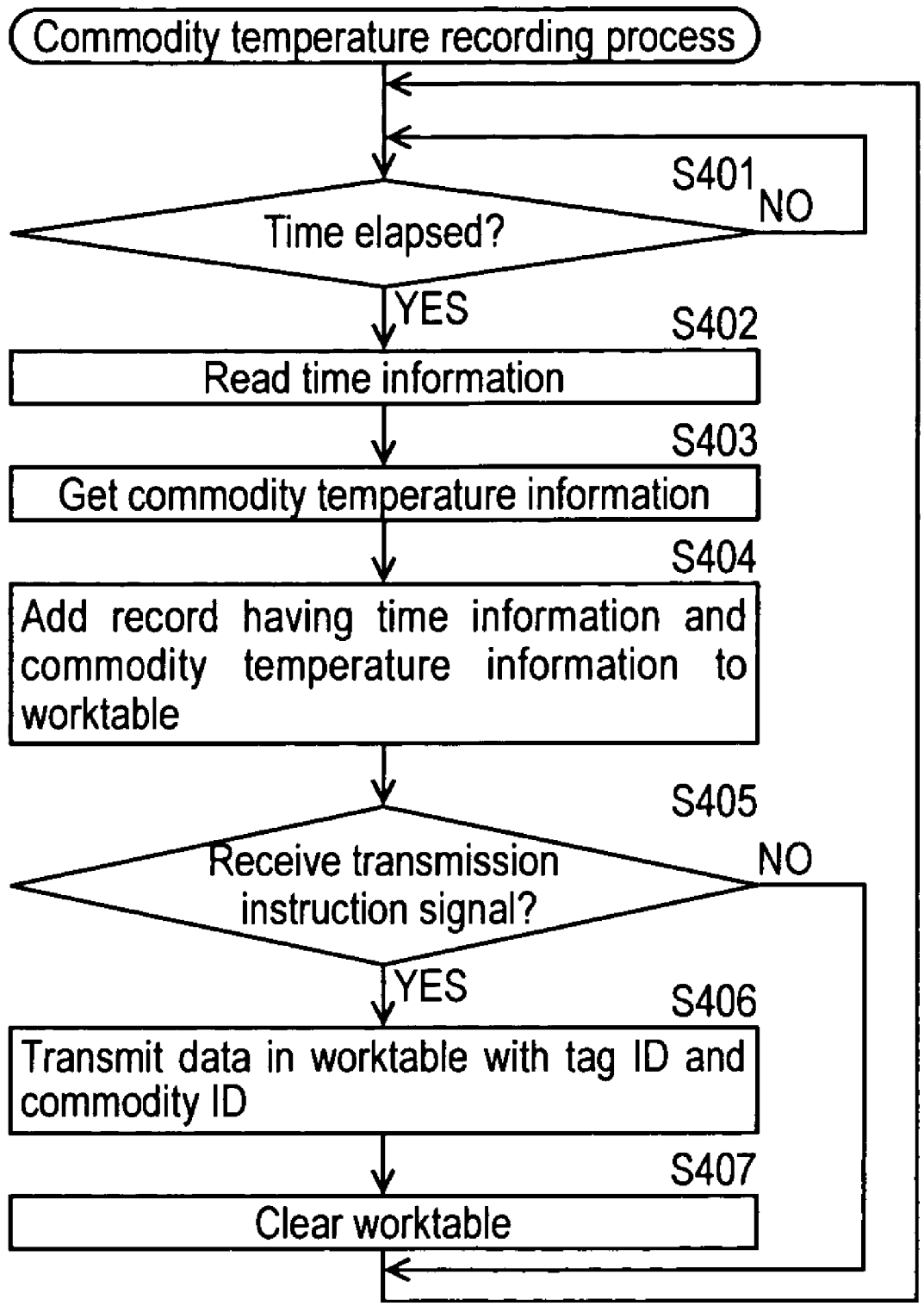
FIG. 12 is a flowchart showing a commodity temperature recording process according to a second embodiment.

FIG. 12 is a flowchart showing the commodity temperature recording process executed by the electronic tag 10 in the second embodiment. The commodity temperature recording program 12 according to the second embodiment corresponds to the record controlling portion and the transmission controlling portion.

In the second embodiment, the CPU 10*b* of the electronic tag 10 waits until a predetermined time interval elapses (S401, NO) in the same manner as the first embodiment. After the expiration of the predetermined time interval (S401, YES) the CPU 10*b* read the time information recorded in the predetermined area in the RAM 10*c* (S402), gets the commodity temperature information (S403) and add a new record that consists of the time information and the commodity temperature information to the worktable 13 (S404). The process in the second embodiment does not have the process corresponding to S105 through S108 in FIG. 9. After S404, the CPU 10*b* checks whether the transmission instruction signal is received from the gate antenna G or not (S405). If it is not received (S405, NO), the CPU 10*b* returns the process to S401. When the CPU 10*b* receives the transmission instruction signal from the gate antenna G during the execution of the process loop S401 through S405 (S405, YES), the CPU 10*b* transmits the data (all records) in the worktable 13 with the tag ID in the flash memory 10*h* to the gate terminal 20 connected to the gate antenna G (S406), clears the worktable 13 (S407) and executes the process loop S401 through S405.

According to the commodity temperature recording process as described above, the electronic tag 10, which is attached to a commodity by a producer or a processor, records the commodity temperature at the predetermined time intervals. Further, the electronic tag 10 transmits the data in the worktable 13 to the gate terminal 20 in response to the transmission instruction signal from the gate antenna G when the commodity passes through the carrying-in gate or the taking-out gate on which the gate antenna G is installed. Then the CPU 10*b* clear the worktable 13. Therefore, the data of the commodity (a set of records having the time information and the commodity temperature information) accumulated in the electronic tag 10 within a period of time for moving the commodity from one gate terminal 20 to the next gate terminal 20 (i.e., a period of time for transport by a carrier or a period of time for retention by a warehouseman or a wholesaler) are delivered to the gate terminal 20.

Figure 13:
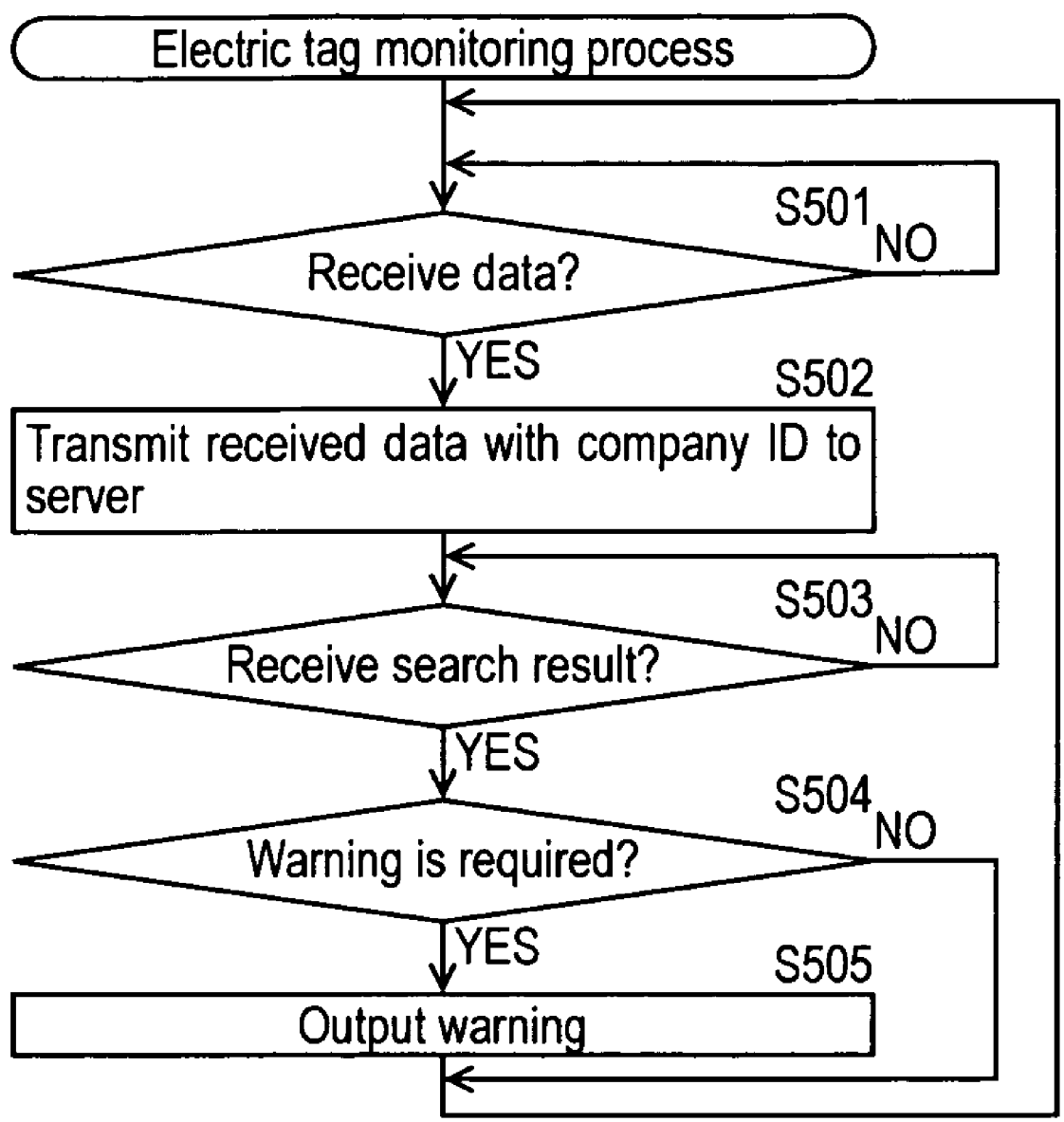
FIG. 13 is a flowchart showing an electronic tag monitoring process according to the second embodiment.

FIG. 13 is a flowchart showing the electric tag monitoring process executed in the gate terminal 20. The electric tag monitoring process of the second embodiment corresponds to the determining portion, the warning output portion and the transmission controlling portion of the gate terminal 20. Further, the communication controlling device 20*c* of the second embodiment, corresponds to the transmitting portion and the receiving portion of the gate terminal 20. In the second embodiment, the CPU 20*a* of the gate terminal 20 waits until it receives the data in the worktable 13 from any electronic tags 10 (S501, NO) in the same manner as the first embodiment. However, the process in the second embodiment does not have the process corresponding to S202 through 5204 in FIG. 10. Receiving the data from the electronic tag 10 (S501, YES), the CPU 20*a* transmits the received data with the company ID to the server 30 (S502). Then, the CPU 20*a* of the gate terminal 20 waits the response (search result) from the server 30 (S503, NO).

Figure 14:
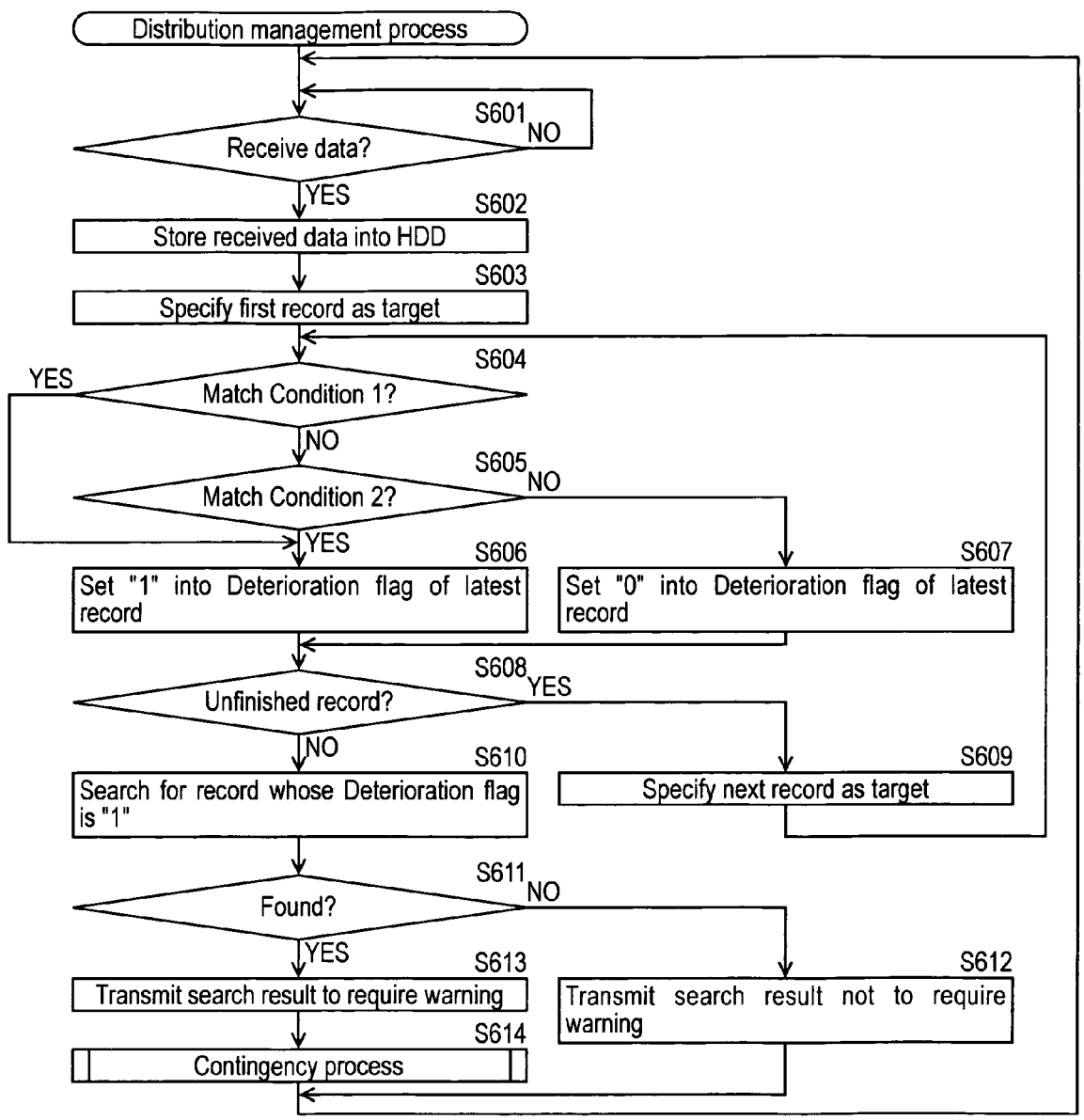
FIG. 14 is a flowchart showing a distribution management process according to the second embodiment.

On the other hand, receiving the data transmitted by the gate terminal 20 at S502, the server 30 executes the distribution management process. FIG. 14 is a flowchart showing the distribution management process executed on the server 30 of the second embodiment. In addition, the distribution management program and the communication controlling device 30*c* correspond to the receiving portion and the transmitting portion of the storage device.

In the second embodiment, the CPU 30*a* of the server 30 waits until it receives the data from the gate terminal 20 (S601, NO) in the same manner as the first embodiment. Receiving the data from the gate terminal 20 (S601, YES), the CPU 30*a* stores the received data into the predetermined table in the HDD 30*f* (S602).

Further, the CPU 30*a* specifies the first record in the data received from the gate terminal 20 as a target (S603). Then the CPU 30*a* determines whether the target record matches either of the first and second deterioration conditions read from the "condition 1" and "condition 2" fields of the condition table 11 in the HDD 30*f* (S604, S605). When the target record matches either of the first and second deterioration conditions (S604, YES, or S605, YES), the CPU 30*a* sets "1" in the "Deterioration flag" field (S606). If the target record matches neither of the first nor second deterioration conditions (S604, NO and S605, NO), the CPU 30*a* sets "0" in the "Deterioration flag" field (S607). If the data received from the gate terminal 20 includes an unfinished record (S608, YES), the CPU 30*a* specifies the next unfinished record as a target (S609) and determines whether the target record matches either of the first and second deterioration conditions (S604, S605).

During the process loop of S604 through S609, if there is no unfinished record in the data received from the gate terminal 20 (S608, NO), the CPU 30*a* searches the above-described predetermined table for the record whose deterioration flag is "1" (S610). If the record whose deterioration flag is "1" was not found (S611, NO), the CPU 30*a* transmits the search result showing that the warning is unnecessary to the gate terminal 20 (S612) and then returns the process to 5601.

On the other hand, if the record whose deterioration flag is "1" was found (S611, YES), the CPU 30*a* transmits the search result showing that the warning is necessary to the gate terminal 20 (S613) and executes the contingency process (S614) as with S305 in FIG. 11. Then, the CPU, 30a returns the process to S601. At S601, the CPU 30a waits until the next data is received from any one of the gate terminals 20. In addition, the search result corresponds to the result information.

Returning to the description of FIG. 13, when the CPU 20a of the gate terminal 20 receives the search result from the server 30 (S503, YES), the CPU 20a determines whether the search result requires the warning or not (S504). If the search result does not require the warning (S504, NO), the CPU 20a returns the process to S501 and waits until the next data is received from the electronic tag 10. On the other hand, the search result requires the warning (S504, YES), the CPU 20a outputs the warning in the same manner as S204 in FIG. 10 (S505) and then waits until the next data in the worktable 13 is received from any one of the electronic tags 10 (S501, NO).

Since the above-described electronic tag monitoring process is executed, the gate terminal 20, which always outputs the transmission instruction signal, is able to collect the data accumulated in the electronic tag 10 when the electronic tag 10 passes through the communicatable zone of the gate antenna G. Further, the gate terminal 20 adds the company ID to the collected data and transmits the data with the company ID to the server 30.

On the other hand, the server 30 stores the data that are accumulated in the electronic tags 10 and collected by the gate terminals 20 in a lump. That is, the server 30 stores the data that indicate the conditions of the respective commodities during distribution.

Further, the server 30 determines whether the stored data matches the first and second deterioration conditions defined in the condition table or not, and set the deterioration flag if it matches the condition. Then, the server 30 searches for the record in which the deterioration flag is set and transmits the search result to the gate terminal 20. In the second embodiment, the server 30 is a subject to determine whether the commodity was deteriorated or not, and the gate terminal 20 determines whether the warning should be output or not according to the search result from the server 30.

When the search result from the server 30 based on the data collected from the electronic tags 10 requires the warning, the gate terminal 20 outputs the warning to give a notice to the chairman who is responsible for the commodity to which the electronic tag 10 is attached about the deterioration of the commodity. The chairman who receives the notice can know that some commodities were deteriorated within his/her responsible term. Then, the chairman who is aware that some commodities were deteriorated can confirm the deteriorated commodities and remove them.

The data stored in the server 30 can be used as a database for a follow-up survey of the conditions of the commodities during distribution as with the first embodiment. Further, the average commodity temperature of each section along the distribution channel may be calculated for each of the gate terminals. In such a case, if the average commodity temperature of each section is disclosed on a web page on the network N, the condition of the commodity during distribution will be disclosed to consumers.

As described above, the distribution management system of the second embodiment checks deterioration of the respective commodities at each time when the commodities pass through the communicatable zone of the gate antenna G. Since the gate terminals are installed at the carrying-in gate or the taking-out gate of traders, the quality of commodities are checked when a chairman of the commodities is replaced. Therefore, a trader can check whether the any commodities are deteriorated or not immediately after the replacement of the chairman.

Further, according to the second embodiment, the quality of commodity is checked at each time it passes through the communicatable zone of the gate antenna G. This clarifies who is responsible with respect to the issue of deterioration.

Still further, according to the second embodiment, when deterioration of a commodity is found, a trader can remove the deteriorated commodity, which enables a quick response such as a supplement of a commodity, an apology and indemnity before the commodity reaches lower most part in the distribution channel.

Yet further, the second embodiment enables to disclose the information about the commodity during distribution to consumers through the use of the data accumulated in the server 30. Therefore, consumers can confirm safety of foods to eat.

Third Embodiment

The distribution management system according to the third embodiment is different from those of the first and second embodiments, it can check deterioration of commodities periodically during transport. More specifically, the gate terminal 20 and the gate antenna G are installed in the means of transport in the third embodiment.

Figure 15:
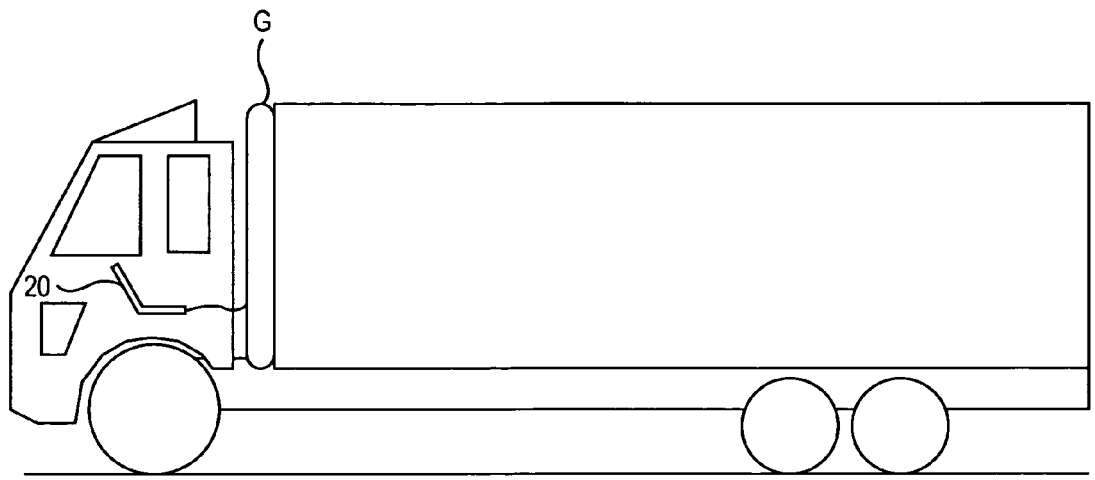
FIG. 15 is a side view of a transportation truck according to a third embodiment.

FIG. 15 is a side view of a truck that carries the gate terminal 20 and the gate antenna G. As shown in FIG. 15, the truck is provided with the gate antenna G near the transportation container under loading. Further, a notebook type personal computer that is connected to the gate antenna G through a cable is mounted on a cab of the truck. The personal computer has a function as the gate terminal 20.

Figure 16:
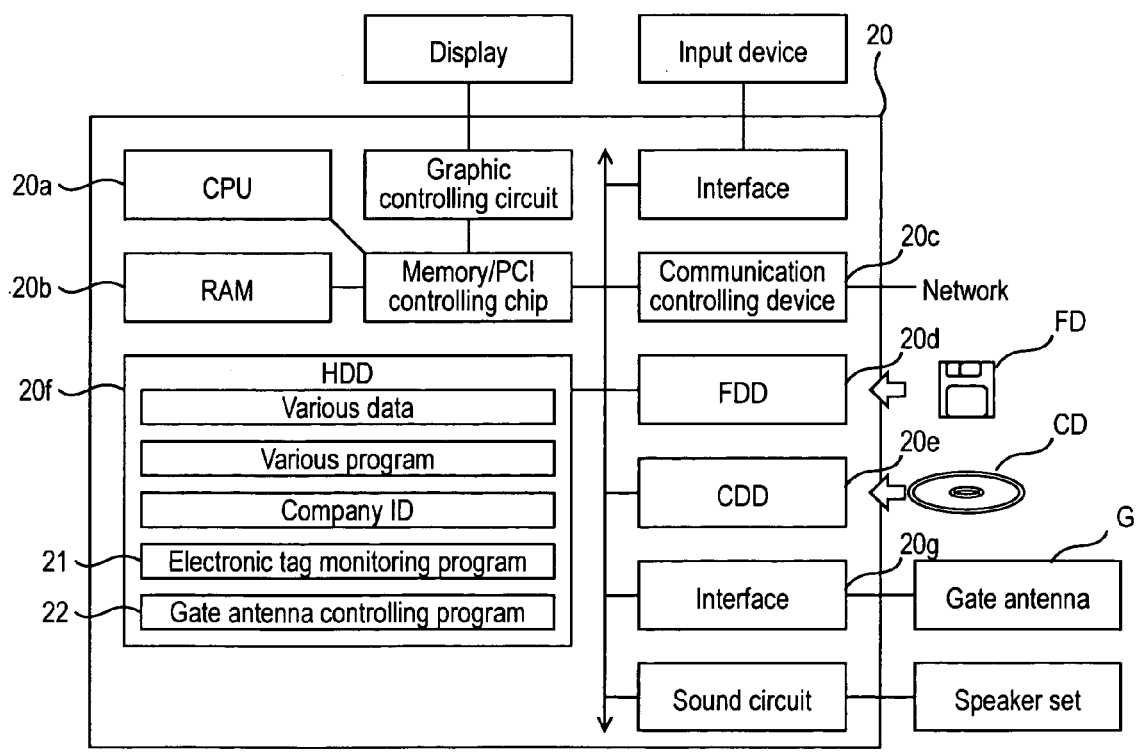
FIG. 16 is a block diagram showing a general inside construction of a gate terminal according to the third embodiment.

FIG. 16 is a block diagram showing a generic construction inside the gate terminal 20 according to the third embodiment. As is evident from comparison between FIG. 16 and FIG. 7, the program 21, which is identical to the electronic tag monitoring program 21, is installed in the HDD 20f of the gate terminal 20 in the third embodiment. Further, a gate antenna controlling program 22 that is an original for the third embodiment is also installed in the HDD 20f. The gate antenna controlling program 22 corresponds to the instructing portion of the gate terminal.

Figure 17:
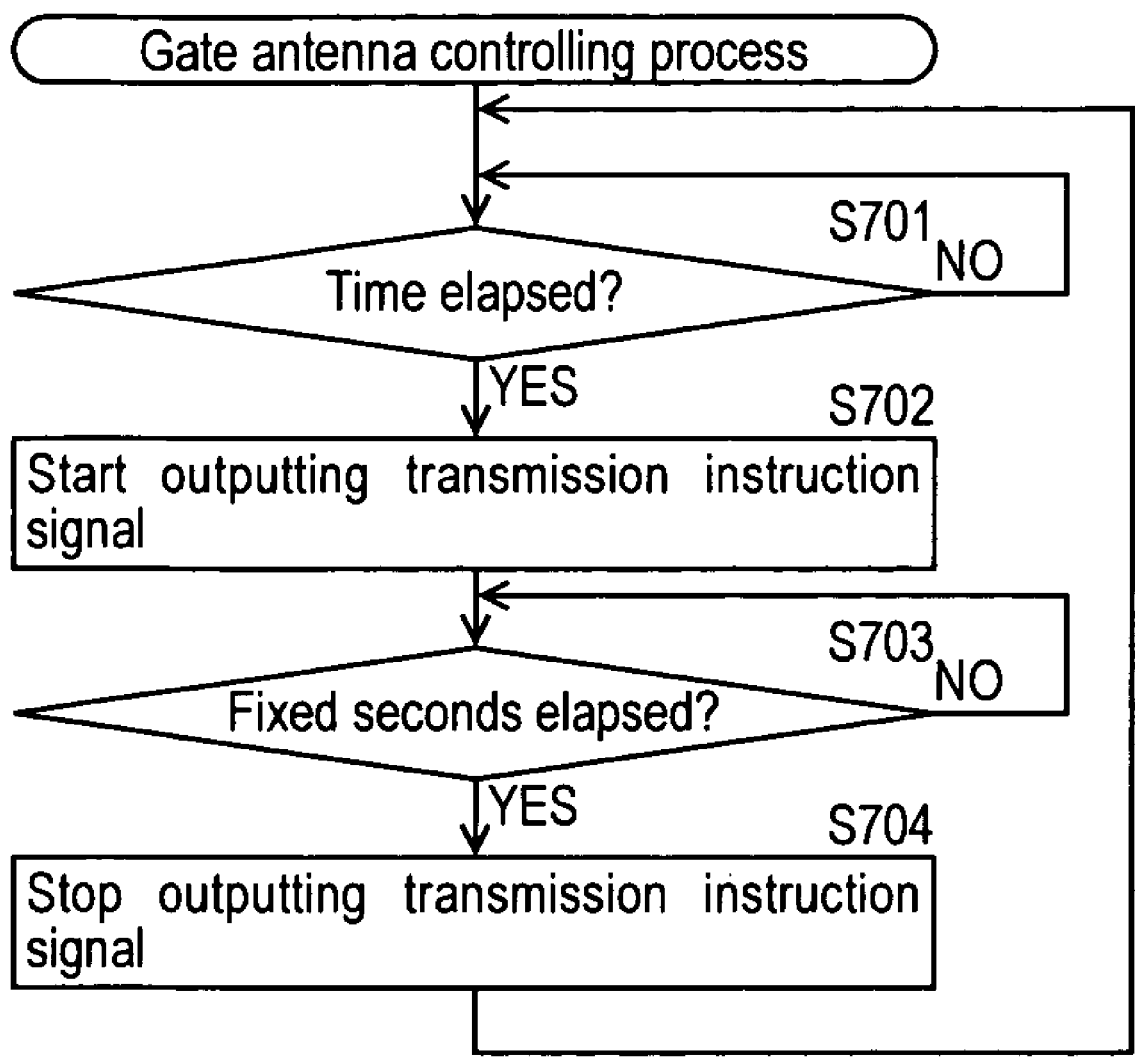
FIG. 17 is a flowchart showing a gate antenna controlling process according to the third embodiment.

FIG. 17 is a flowchart showing the gate antenna controlling process that is executed by the CPU 20a in accordance with the gate antenna controlling program 22.

In the gate antenna controlling process, the CPU 20a waits until a predetermined time interval (ten minutes, for example) elapses (S701, NO). After the expiration of the predetermined time interval (S701, YES), the CPU 20a controls the interface 20g to start outputting the transmission instruction signal from the gate antenna G (S702). Then, the CPU 20a waits until fixed seconds (ten seconds, for example) elapses (S703, NO). After the expiration of the fixed seconds (S703, YES), the CPU 20a controls the interface 20g to stop outputting the transmission instruction signal from the gate antenna G (S704). After that, the CPU 20a repeats the process from S701 to S704.

When the above-described gate antenna controlling process is executed, the gate terminal 20 outputs the transmission instruction signal from the gate antenna G within the fixed seconds after each the predetermined time interval. Therefore, the electronic tags 10 attached to the commodities loaded inside the transportation warehouse of the truck periodically receive the transmission instruction signal.

Each of the electronic tag 10 inside the transportation warehouse executes the commodity temperature recording process shown in FIG. 9. Since the electronic tag 10 receives the transmission instruction signal after each the predetermined time interval (S109), the electronic tag 10 repeatedly transmits the data accumulated in the predetermined time interval to the gate terminal 20 (S110).

On the other hand, since the gate terminal 20 executes the electronic tag monitoring process shown in FIG. 10, the gate terminal 20 collects data from the respective electronic tags 10 after each the predetermined time interval (S201), transmits all of the data with the company ID of the carrier to the server 30 (S205); and outputs the warning from the speaker or the screen when the gate terminal 20 finds the data including the deterioration flag "1" (S202 through S204).

As described above, the third embodiment enables to periodically check the deterioration of the commodities during transport.

In accordance with the third embodiment, an interface to carry out data communication through a satellite communication line or a wireless telephone line is applied to the communication controlling device 20c that allows the gate terminal 20 to access to the network N. Further, a wireless LAN interface (a wireless LAN card, etc.) may be applied to the communication controlling device 20c when the means of transport is a truck or a freight train. In such a case, when the truck or the freight train approaches a so-called hot spot, the gate terminal 20 loaded, on the spot transmits the data collected from the respective electronic tag 10 to the server 30.

What is claimed is:

1. A distribution management system comprising:
   a great number of electronic tags that are directly attached to commodities to be transported, one by one; and
   a great number of gate terminals located on distribution channels of said commodities,
   wherein each of said electronic tags includes,
   a recording portion that stores information,
   a transmitting portion that transmits information to said gate terminals;
   a commodity temperature detecting portion that detects temperature of the commodity to which the electronic tag is attached;
   a record controlling portion that records information created based on the commodity temperature detected by said commodity temperature detecting portion into said recording portion at the predetermined time intervals, and
   a transmission controlling portion that makes said transmitting portion transmit the information stored in said recording portion to said gate terminals,
   wherein each of said gate terminals includes,
   a receiving portion that receives the information from said electronic tags,
   a determining portion that determines whether a warning should be output or not based on the received information from said electronic tags, and
   a warning portion that outputs the warning when said determining portion determines that the warning should be output.

2. The distribution management system according to claim 1, further comprising a storage device that is connected with said gate terminals through a network, said storage device including a receiving portion that receives the information from said respective gate terminals and a recording portion that stores the information received by said receiving portion of said storage device,
   wherein each of said gate terminals further includes a transmitting portion that transmits information to said storage device, and a transmission controlling portion that makes said transmitting portion of said gate terminal transmit the received information to said storage device when said receiving portion of said gate terminal receives the information from said electronic tags.

3. The distribution management system according to claim 1, wherein said record controlling portion records the commodity temperature information detected by said commodity temperature detecting portion at the predetermined time interval to said recording portion of said electronic tag, and records deterioration information to said recording portion of said electronic tag when the commodity temperature information recorded in said recording portion of said electronic tag does not satisfy a predetermined requirement, said deterioration information showing that the commodity temperature information does not satisfy said requirement,
   wherein said transmission controlling portion of each of said electronic tags makes said transmitting portion of said electronic tag transmit said deterioration information recorded in said recording portion of said electronic tag to said gate terminals, and
   wherein said determining portion of each of said gate terminals determines whether a warning should be output or not based on said deterioration information received by said receiving portion of said gate terminal from said electronic tag.

4. The distribution management system according to claim 2, wherein said record controlling portion of each of said electronic tags records the commodity temperature information detected by said commodity temperature detecting portion at the predetermined time interval to said recording portion of said electronic tag,
   wherein said transmission controlling portion of each of said electronic tags makes said transmitting portion of said electronic tag transmit the commodity temperature information recorded in said recording portion of said electronic tag to said gate terminals,
   wherein said storage device further includes a transmitting portion that determines whether the commodity information at the predetermined time intervals for each of said electronic tag recorded in said recording portion of said storage device satisfies a predetermined requirement or not and that transmits the result information of the determination to said gate terminal,
   wherein each of said gate terminals further includes a receiving portion that receives said information of the result from said storage device, and
   wherein said determining portion of each of said gate terminals determines whether a warning should be output or not based on the information of the result received by said receiving portion of said gate terminal from said storage device.

5. The distribution management system according to claim 1, wherein each of said electronic tags further includes a receiving portion that receives information sending instruction from any one of said gate terminals,
   wherein said transmission controlling portion of said electronic tag makes said transmitting portion transmit the information recorded in said recording portion of said electronic tag to said gate terminals, and
   wherein each of said gate terminals further includes an instructing portion that periodically instructs said each of said electronic tags to transmit the information to itself.

* * * * *